July 29, 1924.
E. ACKERMAN
VEHICLE CURTAIN
Filed July 10, 1923
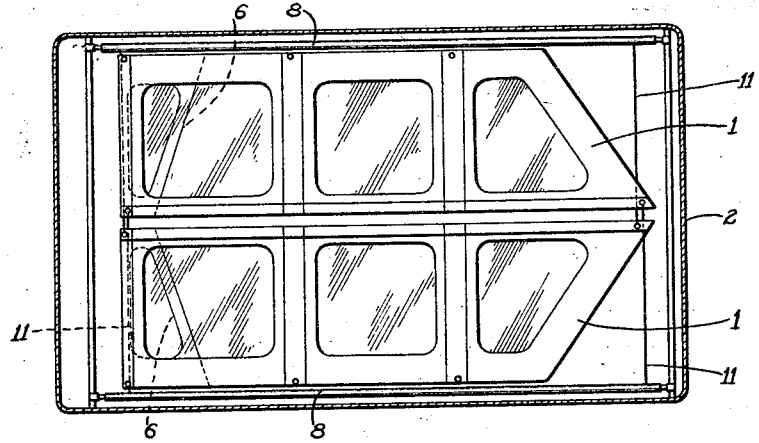
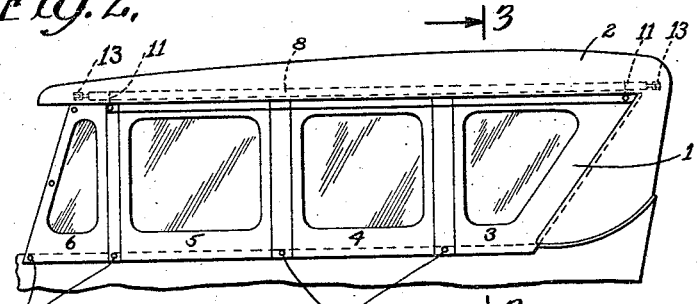
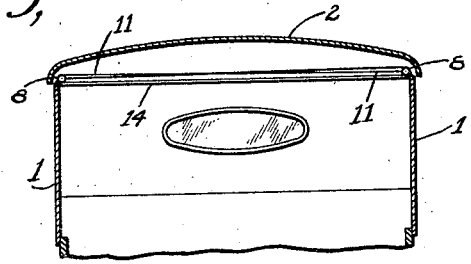
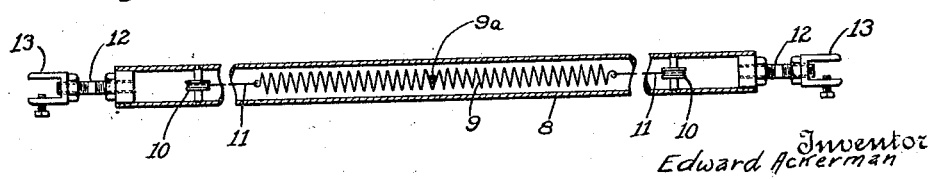
Inventor
Edward Ackerman
By his Attorney Patented July 29, 1924.

1,503,101

UNITED STATES PATENT OFFICE.

EDWARD ACKERMAN, OF NEW YORK, N. Y.

VEHICLE CURTAIN.

Application filed July 10, 1923. Serial No. 650,643.

*To all whom it may concern:*

Be it known that I, EDWARD ACKERMAN, a subject of Rumania, residing at New York city, county of New York, State of New York, United States of America, has invented certain new and useful Improvements in Vehicle Curtains, of which the following is a specification.

This invention relates to curtains for vehicles generally, and more particularly to a side curtain structure for use on automobiles and the like.

One object of the invention is to provide a curtain for automobiles and the like so constructed that it may be mounted in the top of the automobile and may be maintained therein in unrolled condition when not in operation, and may be readily pulled out into operative position.

Another object of the invention is to provide for the automatic return of the curtain to inoperative position when not in use.

A still further object of the invention is to provide a curtain construction of the above character, which may be produced at a small cost and is readily applicable to ordinary automobile tops without necessitating any changes in such tops.

Other objects of the invention will appear more clearly from the following description of one embodiment of the invention illustrated in the accompanying drawings, in which:

Fig. 1 is a plan view of a pair of side curtains constructed in accordance with my invention and arranged in inoperative position in the automobile top, the top of the automobile being removed to show the arrangement of the curtains more clearly.

Fig. 2 is a side elevation of a side curtain in operation position on the automobile body.

Fig. 3 is a partial transverse cross-section through the automobile body, showing both side curtains in operative position, the section being taken on line 3—3 of Figure 2.

Fig. 4 is a cross-section of the hollow rod and spring which is detachably secured longitudinally and at one side of the automobile and is operatively connected with one edge of its corresponding side curtain.

In this embodiment of the invention, I provide a pair of side curtains (1, 1) adapted to be concealed in unfolded condition under the top (2) of an automobile or like vehicle. The side curtains are of the usual type, comprising folding sections (3, 4, 5 and 6) having transparent portions and adapted when in use to be secured to the body of the automobile by means of fasteners (7). It will be noted that, when the curtains are concealed in the automobile top, the folding section (6) is folded under the adjacent section (5).

In order to provide for the automatic movement of the side curtains to concealed position, I provide a pair of hollow rods (8, 8) arranged under the top at either side thereof. Each rod (8) contains a spring (9) rigidly secured at its center to rod (8) as by a pin (9a). If desired, the spring (9) may be replaced by a pair of springs, each having one end fixedly secured to the rod (8) at substantially the middle thereof. The free ends of the spring (9) are connected by cords (11) with the ends of its corresponding curtain (1), the cords (11) passing over suitable pulleys (10) also mounted within the hollow rod (8). In the preferred embodiment illustrated in the drawing, the rods are so arranged that the rod (8) at one side of the automobile top co-operates with a curtain arranged at the opposite side of the top, as clearly shown in Fig. 1. Moreover, as shown in Fig. 3, each curtain (1) is adapted to slide over the rod (8) pertaining to the other curtain. When the curtains are in concealed position under the top of the vehicle, the edge of each curtain projects slightly over the rod of the other curtain so that it may be grasped and pulled down against the action of the spring (9) into operative position, in which it is fastened to the body of the automobile by means of the usual fasteners (7). When said fasteners are released, each curtain is caused by the spring (9) to slide over the rod (8) of the other curtain until just the edge of the curtain projects over such rod. Each rod (8) thus acts as a support for one edge of a curtain, while the other edge of the curtain is maintained substantially horizontally by the pull of the spring (9) on the connecting cord (11) of said curtain. If desired, the vehicle top may be provided with a false top (14) to conceal the curtains from the view of the passengers in the vehicle, as shown in Fig. 3. Each rod (8) is detachably secured to the top by means of clamps (13) adjustable on screw-threaded bolts (12). In order to make the rods (8) adjustable for use with automobile tops of various lengths, such rods may be provided with telescoping sections, as will be readily understood by persons versed in the art.

It will be apparent from the foregoing that I have provided a novel mounting for curtains of a vehicle, and particularly of an automobile, in position to be entirely out of the way when not in use, but ready at all times to be easily drawn to operative position. The novel arrangement permits of more rapid changing of a vehicle, such as an automobile, from an open condition to a closed condition, or vice versa, without the usual troublesome folding and unfolding of the side curtains and the storing thereof under seats or similar not readily accessible places.

It will be further understood that various changes may be made in the construction illustrated herein without departing from the spirit and scope of the invention as defined in the appended claims.

I claim:

1. In combination with a vehicle top, a rod having a hollow portion and detachably secured longitudinally of the top, a spring arranged entirely within the hollow portion of said rod, said spring being fixedly secured intermediate its ends and having its ends freely movable, a curtain, and means for connecting said curtain with the free ends of the spring.

2. In combination with a vehicle top, a pair of rods each having a hollow portion, means for detachably securing said rods longitudinally of the top, a spring arranged entirely in the hollow portion of each rod and fixedly secured intermediate its ends, a curtain co-operating with each rod, and means for connecting each curtain with the ends of the spring in its corresponding rod.

3. In combination with a vehicle top, a pair of rods each having a hollow portion, means for detachably securing said rods longitudinally of the top, a spring arranged entirely in the hollow portion of each rod and fixedly secured intermediate its ends, a curtain co-operating with each rod, means for securing said curtains in operative position at the respective sides of the vehicle, and means connecting each curtain with the ends of the spring in its corresponding rod.

4. In combination with a vehicle top, a pair of rods each having a hollow portion, means for detachably securing said rods longitudinally of the top on either side of the longitudinal center line thereof, spring means arranged entirely in the hollow portion of each rod, a side curtain co-operating with each rod and means for connecting the curtain operating at one side of the vehicle with the ends of the spring in the rod arranged on the other side of the longitudinal center line of the top.

5. In combination with a vehicle top, a pair of hollow rods, means for detachably securing said rods longitudinally of the top at either side thereof, a spring arranged longitudinally in each rod, a curtain co-operating with each rod, and means for connecting the curtain operating at one side of the vehicle with the ends of the spring in the rod arranged at the opposite side of the top.

6. In combination with a vehicle top, a pair of hollow rods, means for detachably securing said rods longitudinally of the top at either side thereof, a spring arranged longitudinally in each rod and fixedly secured intermediate its ends, a curtain co-operating with each rod, and means for securing the curtain operating at one side of the vehicle with the ends of the spring in the rod arranged at the opposite side of the top.

7. In combination with a vehicle top, a pair of hollow rods adjustable as to length, means for detachably securing said rods longitudinally of the top at either side thereof, a spring arranged longitudinally in each rod, a curtain co-operating with each rod, and means for connecting the curtain operating at one side of the vehicle with the ends of the spring in the rod arranged at the opposite side of the top.

8. In combination with a vehicle top, a pair of hollow rods, means for detachably securing said rods longitudinally of the top at either side thereof, a spring arranged longitudinally in each rod, and fixedly secured intermediate its ends, a pulley adjacent each end of each rod and located within the rod, a curtain co-operating with each rod, means for connecting the curtain operating at one side of the vehicle with the ends of the spring in the rod arranged at the opposite side of the top, said connecting means passing over the pulleys in its respective rod.

In testimony whereof, the said EDWARD ACKERMAN has signed his name to this specification in the presence of two subscribing witnesses, this 7th day of July, 1923.

EDWARD ACKERMAN.

Witnesses:
  R. F. KIRSHNER,
  M. GOLDFARB.